United States Patent
Farraro et al.

(10) Patent No.: US 10,664,584 B2
(45) Date of Patent: *May 26, 2020

(54) LOCKABLE WIDGETS ON A MOBILE DEVICE

(71) Applicant: eBay Inc., San Jose, CA (US)

(72) Inventors: Eric J. Farraro, San Jose, CA (US); John Tapley, San Jose, CA (US); Oliver Nicholas Cockcroft, Las Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,331

(22) Filed: Jan. 9, 2019

(65) Prior Publication Data

US 2019/0156010 A1 May 23, 2019

Related U.S. Application Data

(63) Continuation of application No. 15/936,193, filed on Mar. 26, 2018, now Pat. No. 10,198,569, which is a
(Continued)

(51) Int. Cl.
| | | |
|---|---|---|
| *G06F 12/14* | (2006.01) | |
| *G06F 21/36* | (2013.01) | |
| *G06F 21/31* | (2013.01) | |
| *G06F 3/0481* | (2013.01) | |
| *G06F 3/0482* | (2013.01) | |

(Continued)

(52) U.S. Cl.
CPC ............ *G06F 21/36* (2013.01); *G06F 3/0482* (2013.01); *G06F 3/04817* (2013.01); *G06F 3/04845* (2013.01); *G06F 3/04883* (2013.01); *G06F 21/31* (2013.01); *G06F 3/048* (2013.01); *H04M 1/72583* (2013.01); *H04N 1/00408* (2013.01); *H04N 1/00411* (2013.01); *H04N 1/00413* (2013.01); *H04N 1/00416* (2013.01); *H04N 1/00419* (2013.01)

(58) Field of Classification Search
CPC .. G06F 21/36; G06F 3/04883; G06F 3/04845; G06F 3/0482; G06F 3/04817; G06F 21/31; H04M 1/72583; H04N 1/00411; H04N 1/00416; H04N 1/00419; H04N 1/00408
USPC .......................................................... 726/19
See application file for complete search history.

(56) References Cited

U.S. PATENT DOCUMENTS

| | | |
|---|---|---|
| 5,963,191 A | 10/1999 | Jaaskelainen, Jr. |
| 7,480,870 B2 | 1/2009 | Anzures et al. |

(Continued)

OTHER PUBLICATIONS

Applicant Initiated Interview Summary Received for U.S. Appl. No. 13/674,007 dated Oct. 9, 2014, 3 pages.
(Continued)

*Primary Examiner* — Chrisy Parry
(74) *Attorney, Agent, or Firm* — Shook, Hardy & Bacon

(57) ABSTRACT

A software widget running on a user device may be designed to operate in a locked or an unlocked mode. In unlocked mode, the user has full interactivity with the widget. In locked mode, however, at least some of the interactivity with the widget is restricted, despite the fact that the widget still operates normally otherwise while in the locked mode. While in locked mode, user input may be compared against a predefined unlocking sequence to determine if the widget should be unlocked.

20 Claims, 17 Drawing Sheets

Related U.S. Application Data continuation of application No. 15/393,708, filed on Dec. 29, 2016, now Pat. No. 9,953,154, which is a continuation of application No. 14/629,007, filed on Feb. 23, 2015, now Pat. No. 9,536,068, which is a continuation of application No. 13/674,007, filed on Nov. 10, 2012, now Pat. No. 8,966,612.

(60) Provisional application No. 61/647,964, filed on May 16, 2012.

(51) Int. Cl.
*G06F 3/0484* (2013.01)
*G06F 3/0488* (2013.01)
*G06F 3/048* (2013.01)
*H04N 1/00* (2006.01)
*H04M 1/725* (2006.01)

(56) References Cited

U.S. PATENT DOCUMENTS

| | | |
|---|---|---|
| 8,504,842 B1 | 8/2013 | Meacham |
| 8,558,808 B2 | 10/2013 | Forstall et al. |
| 8,904,479 B1 | 12/2014 | Johansson et al. |
| 8,966,612 B2 | 2/2015 | Farraro et al. |
| 9,536,068 B2 | 1/2017 | Farraro et al. |
| 9,953,154 B2 | 4/2018 | Farraro et al. |
| 10,198,569 B2 | 2/2019 | Farraro et al. |
| 2005/0253817 A1 | 11/2005 | Rytivaara et al. |
| 2006/0005207 A1 | 1/2006 | Louch et al. |
| 2008/0055273 A1 | 3/2008 | Forstall |
| 2008/0082930 A1 | 4/2008 | Omernick et al. |
| 2008/0201650 A1 | 8/2008 | Lemay et al. |
| 2009/0249359 A1 | 10/2009 | Caunter et al. |
| 2009/0260022 A1 | 10/2009 | Louch et al. |
| 2009/0271779 A1 | 10/2009 | Clark |
| 2010/0023865 A1 | 1/2010 | Fulker et al. |
| 2010/0245107 A1 | 9/2010 | Fulker et al. |
| 2011/0102171 A1 | 5/2011 | Raji et al. |
| 2011/0210933 A1 | 9/2011 | Forstall |
| 2011/0219303 A1 | 9/2011 | Forstall |
| 2012/0046079 A1 | 2/2012 | Kim et al. |
| 2012/0188072 A1 | 7/2012 | Dawes et al. |
| 2012/0214442 A1 | 8/2012 | Crawford et al. |
| 2012/0272230 A1 | 10/2012 | Lee |
| 2012/0299814 A1 | 11/2012 | Kwon et al. |
| 2013/0268810 A1 | 10/2013 | Prasad |
| 2013/0312083 A1 | 11/2013 | Farraro et al. |
| 2015/0169856 A1 | 6/2015 | Farraro et al. |
| 2017/0109517 A1 | 4/2017 | Farraro et al. |
| 2018/0218144 A1 | 8/2018 | Farraro et al. |

OTHER PUBLICATIONS

Non-Final Office Action received for U.S. Appl. No. 13/674,007, dated Jul. 3, 2014, 8 pages.
Notice of Allowance received for U.S. Appl. No. 13/674,007, dated Oct. 16, 2014, 8 pages.
Preliminary Amendment received for U.S. Appl. No. 13/674,007, filed Jan. 9, 2013, 3 pages.
Final Office Action received for U.S. Appl. No. 14/629,007, dated May 26, 2016, 7 pages.
Response to Non-Final Office Action filed on Oct. 3, 2014 for U.S. Appl. No. 13/674,007, dated Jul. 3, 2014, 11 pages.
First Action Interview—Pre-Interview Communication received for U.S. Appl. No. 14/629,007, dated Sep. 11, 2015, 5 pages.
First Action Interview—Office Action Summary received for U.S. Appl. No. 14/629,007, dated Jan. 21, 2016, 5 pages.
Notice of Allowance received for U.S. Appl. No. 14/629,007, dated Aug. 25, 2016, 8 pages.
Preliminary Amendment received for U.S. Appl. No. 14/629,007, filed Feb. 27, 2015, 10 pages.
Response to Final Office Action filed on Aug. 1, 2016 for U.S. Appl. No. 14/629,007, dated May 26, 2016, 10 pages.
Response to First Action Interview—Pre-Interview Communication filed on Nov. 11, 2015, for U.S. Appl. No. 14/629,007, dated Sep. 11, 2015, 1 page.
Response to Non-Final Office Action filed on Apr. 15, 2016, for U.S. Appl. No. 14/629,007, dated Jan. 21, 2016, 11 pages.
Non-Final Office Action received for U.S. Appl. No. 15/393,708, dated Sep. 21, 2017, 6 pages.
Notice of Allowance received for U.S. Appl. No. 15/393,708, dated Dec. 19, 2017, 7 pages.
Preliminary Amendment received for U.S. Appl. No. 15/393,708, filed Dec. 30, 2016, 8 pages.
Response to Non-Final Office Action filed on Nov. 22, 2017 for U.S. Appl. No. 15/393,708, dated Sep. 21, 2017, 9 pages.
Non-Final Office Action received for U.S. Appl. No. 15/936,193, dated Jun. 15, 2018, 9 pages.
Notice of Allowability received for U.S. Appl. No. 15/936,193, dated Sep. 26, 2018, 7 pages.
Preliminary Amendment filed on Apr. 12, 2018, for U.S. Appl. No. 15/936,193, 8 pages.
Response to Non-Final Office Action filed on Jul. 20, 2018, for U.S. Appl. No. 15/936,193, dated Jun. 15, 2018, 8 pages.

LOCKABLE WIDGETS ON A MOBILE DEVICE

CROSS-REFERENCE TO RELATED APPLICATION

This application is a continuation of and claims the benefit of priority to U.S. patent application Ser. No. 15/936,193, filed Mar. 26, 2018, which is a continuation of and claims the benefit of priority to U.S. patent application Ser. No. 15/393,708, filed on Dec. 29, 2016, which is a continuation of U.S. patent application Ser. No. 14/629,007, filed on Feb. 23, 2015, now U.S. Pat. No. 9,536,068, which is a continuation of U.S. patent application Ser. No. 13/674,007, filed on Nov. 10, 2012, now U.S. Pat. No. 8,966,6124, which claims the benefit of priority to U.S. Provisional Patent Application Ser. No. 61/647,964, filed May 16, 2012, the benefit of priority of each of which is claimed hereby, and each of which are incorporated by reference herein in its entirety.

BACKGROUND

Mobile devices, such as smart phones and tablets, enable mobile widgets to operate on one or more home screens. The mobile widget is a specialized software application that is relatively simple and easy to use (i.e., light). Common examples of mobile widgets include clock widgets, weather widgets, calculator widgets, messaging widgets, and calendar widgets.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example methods and systems to provide lockable widgets on a mobile device are described. In the following description, for purposes of explanation, numerous specific details are set forth in order to provide a thorough understanding of example embodiments. It will be evident, however, to one skilled in the art that the present invention may be practiced without these specific details.

In an example embodiment, onscreen widgets are locked. While a widget may continue to operate while it is locked, some functionality of the widget is restricted until a user unlocks the widget. Other functionality of the widget may continue while in the locked state. For example, while in a locked state, a weather widget may continue to provide weather updates. In another example, an auction widget may continue to provide updates (e.g., higher bids) of items up for auction. Unlocking the widget may be performed in a variety of ways, some of which will be described in more detail later.

Figure 1:
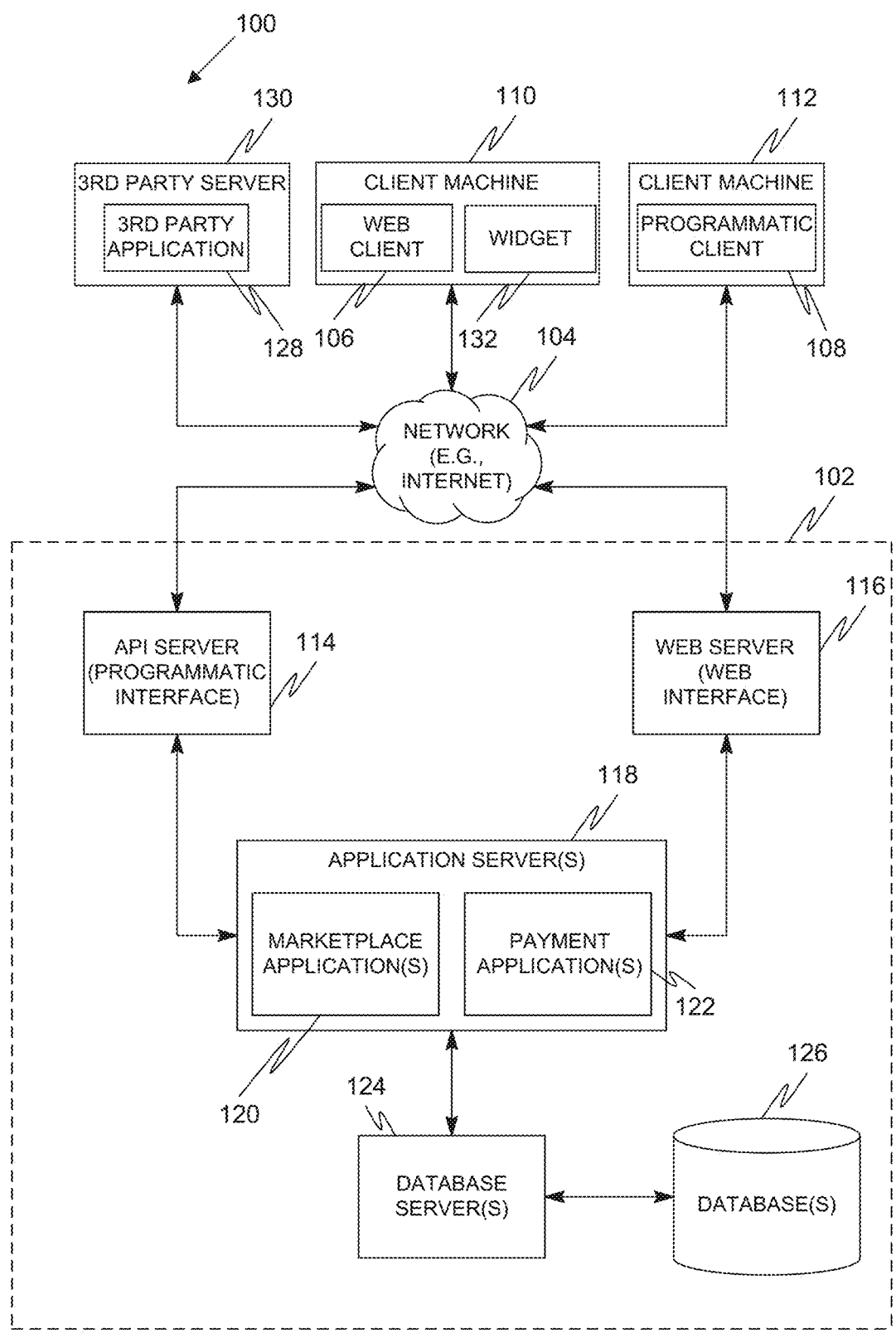
FIG. 1 is a network diagram depicting a networked or network based system, according to an example embodiment, having a client-server architecture configured for exchanging data over a network.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

In an example embodiment, the client machine 110 may include a widget 132. A widget can be a software application designed to be constantly (or nearly constantly) running on a client machine 110, and accessible from a front or main screen of a graphical user interface. Widgets can involve some sort of communication with a server to obtain information, the information then being automatically displayed to a user of the client machine 110 through a graphical user interface. Widgets can run at the operating system level, much like a simple application for the operating system. Many widgets also allow some level of interactivity with the user via the graphical user interface. While there are any number of different types of widgets, widgets for displaying information such as weather, traffic, stock quotes, and sports scores are some of the more popular types of widgets. In the example embodiment in FIG. 1, the widget 132 may be an auction listing widget, which can list the current status/price of an item of interest and allow the user to make an updated bid.

Regardless of the type of widget, in an example embodiment a mechanism to lock the widget can be provided. Locking may either occur explicitly, via the user executing some combination of commands to cause the widget to be locked (e.g., keystrokes, gestures, spoken commands), or may occur implicitly, such as by the system automatically locking the widget when a predetermined amount of time has lapsed with no user input, or when the client machine's screen is turned off or enters a power savings mode.

Figure 2:
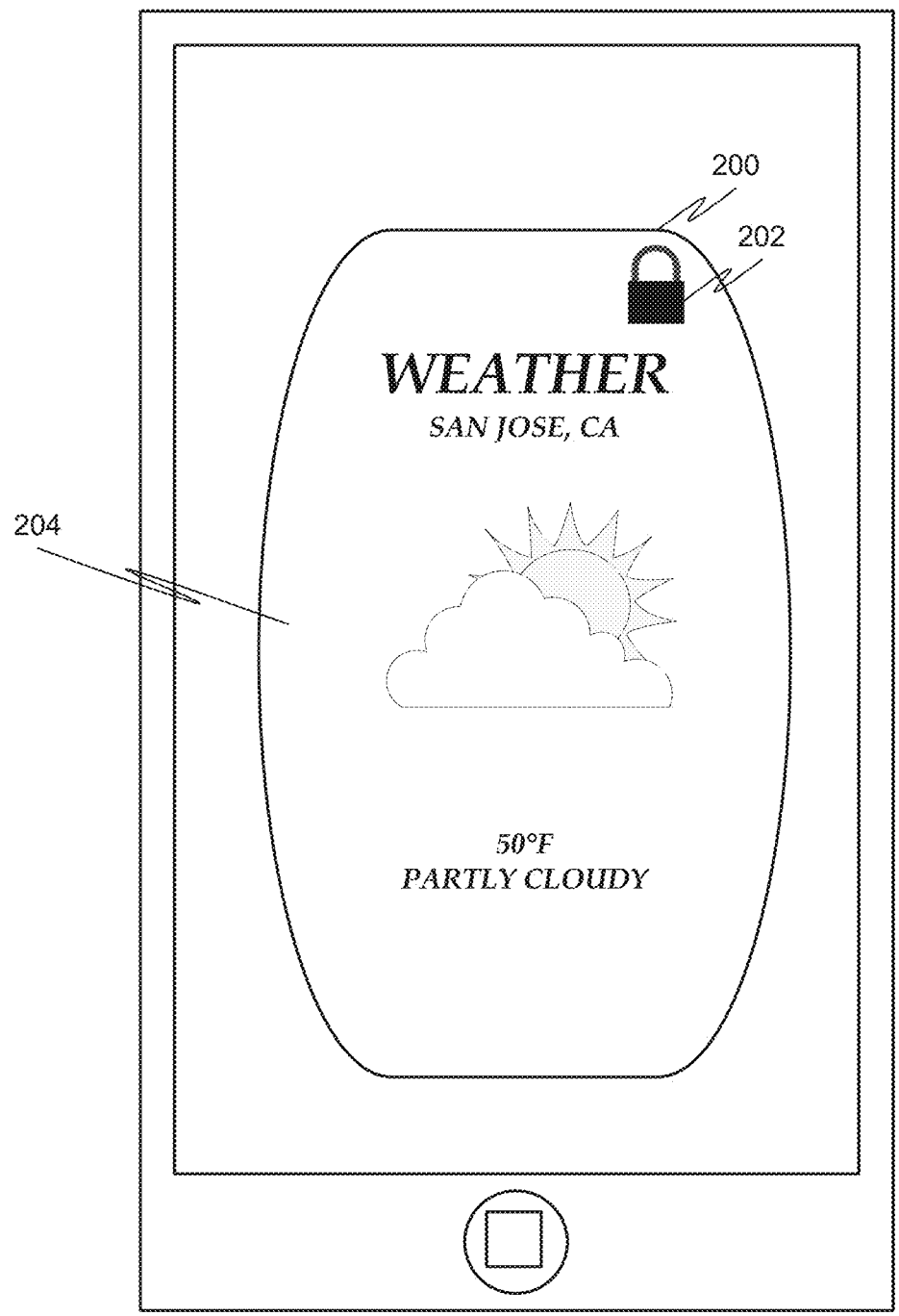
FIGS. 2-4 depict an example portion of a home screen of a client machine having a widget executing thereon in accordance with one example embodiment.

FIG. 2 depicts an example portion of a home screen of a client machine having a widget executing thereon. Here the client machine is a mobile device, such as a smartphone or tablet computer. In such cases, the widget 200 may be referred to as a mobile widget. The mobile widget 200 depicted is a "weather" widget displaying current weather conditions. The mobile widget further includes a "lock" icon 202 indicating that the widget is locked. When a widget is locked, one or more interactive features of the widget are inactivated by being made not accessible or not interactive. As depicted, the weather widget 200 does not include any interactive features (e.g., buttons, sliders) when locked. Thus, in this case, the user is able to see the current weather for San Jose, Calif. 204 (which may have been the last city on which weather was checked, or may be a default city set by the user), but the user is not able to interact with the mobile widget to change the city, or to alter other parameters, such as the type of weather report to receive (e.g., number of days, allergy reports, satellite maps, etc.). Thus, in this example, the interactivity with the mobile widget has been restricted in some way.

Figure 3:
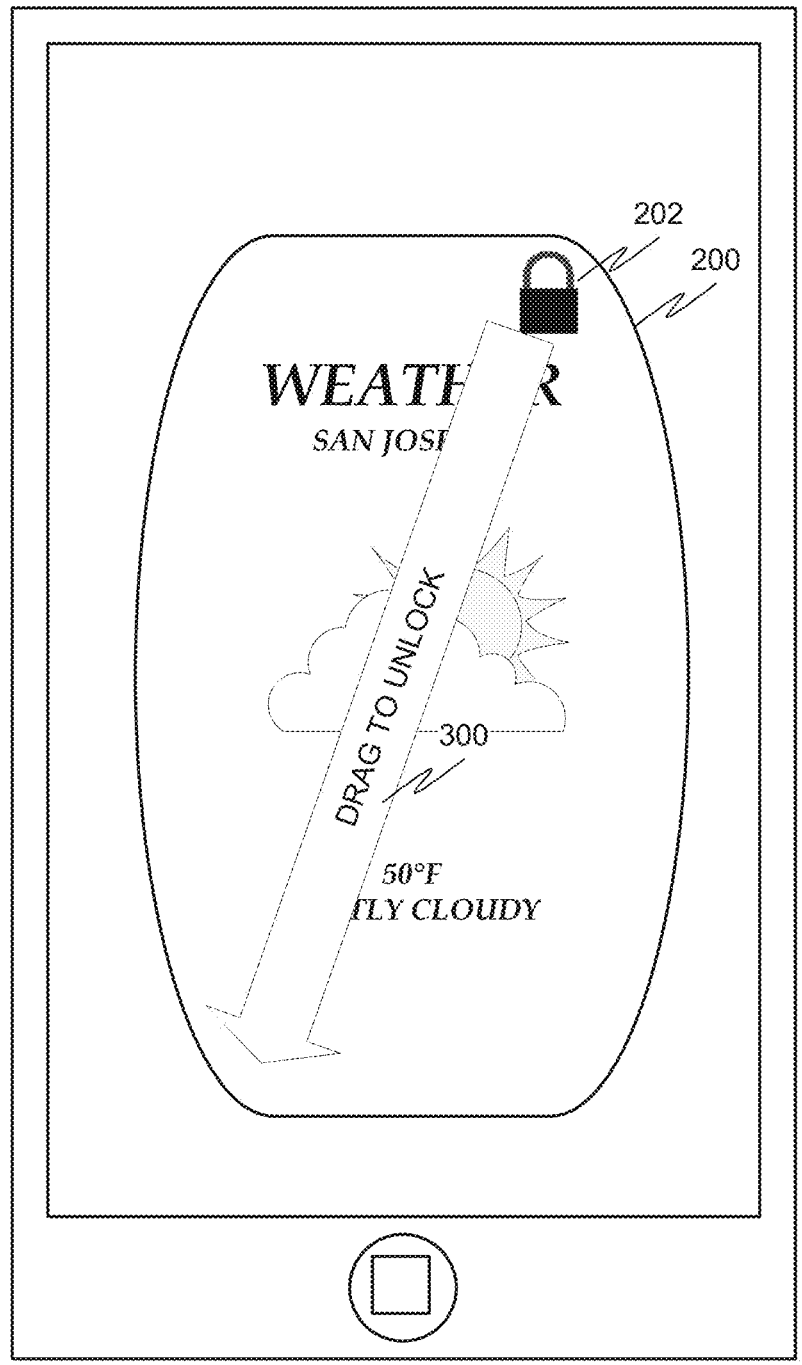

FIG. 3 depicts a second example portion of the home screen of the mobile device having the weather widget executing thereon. In response to input using the touch screen or other input device on the mobile device, the locked widget 200 may display instructions 300 for unlocking the widget. As depicted, the user is instructed to drag the "lock" icon 202 from a current position to a second position on the home screen or within the widget. The lock icon 202 of the widget 200 may be the only active element of the widget in a locked state in this example. It should be noted that in some embodiments the instructions 300 may be displayed without first requiring user input. Indeed, in some embodiments the instructions 300 may simply be always displayed when the mobile widget is locked.

Figure 4:
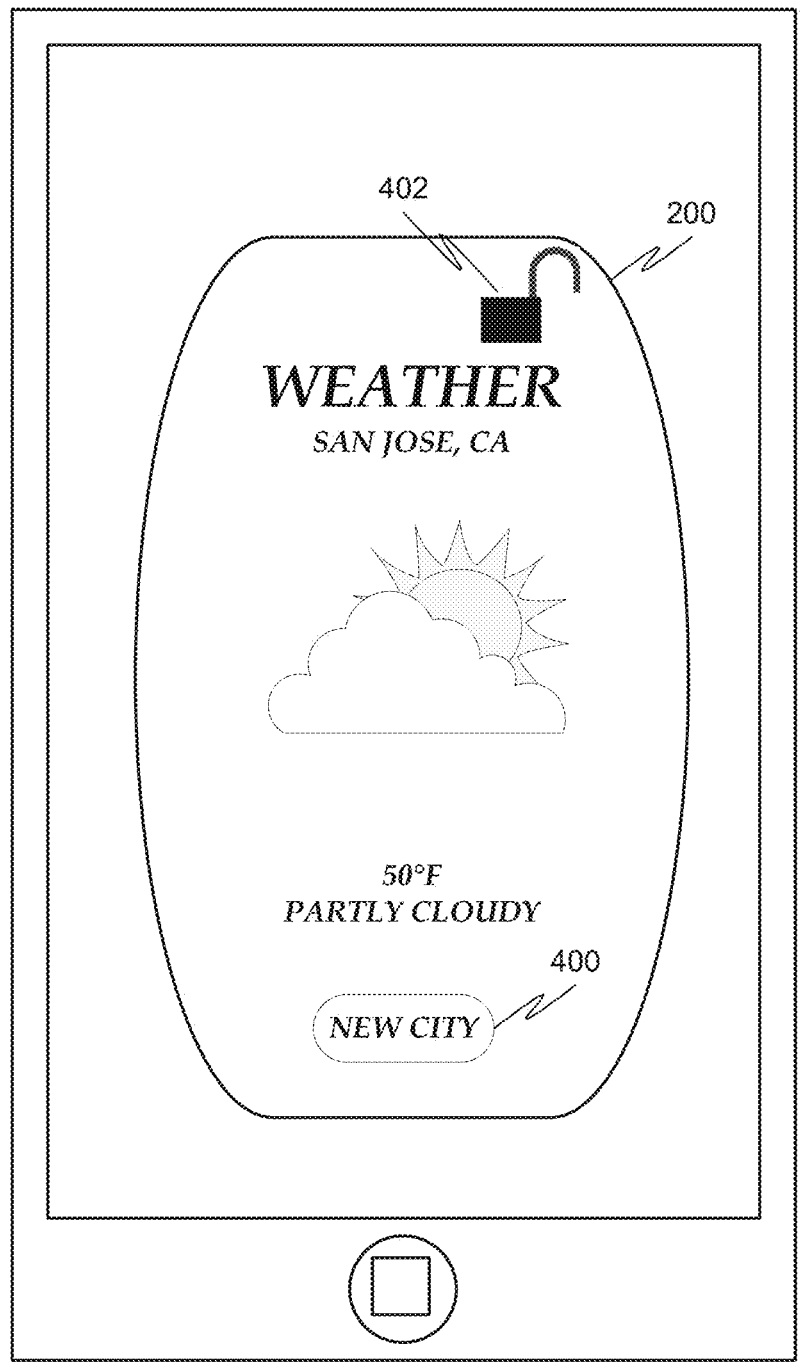

FIG. 4 depicts a third example portion of the home screen of the mobile device having the weather widget executing thereon. In FIG. 4, the widget is unlocked and one or more interactive features, e.g., a button labelled "New City" 400, are provided to the user. These interactive features may be ones that were unavailable while the widget 200 was locked. The widget may be locked again by, for example, pressing the "unlocked" icon 402 in the upper right corner of the widget until the widget indicates that it is locked, returning the example to FIG. 2.

Another example may involve an auction widget. An auction widget may interact with an online auction system to display current status information regarding an item up for auction (either an item the user is auctioning off, or an item the user is interested in purchasing). It should be noted that the term "auction" as used in this document is used broadly, and may cover any item listed on a web site that is primarily involved in auctioning items (for example, the item may be listed as a "buy it now" with a preset price and without any auction component). In another example, a widget may be provided that allows a user to purchase from an ecommerce site, not having any auction element at all.

Figure 5:
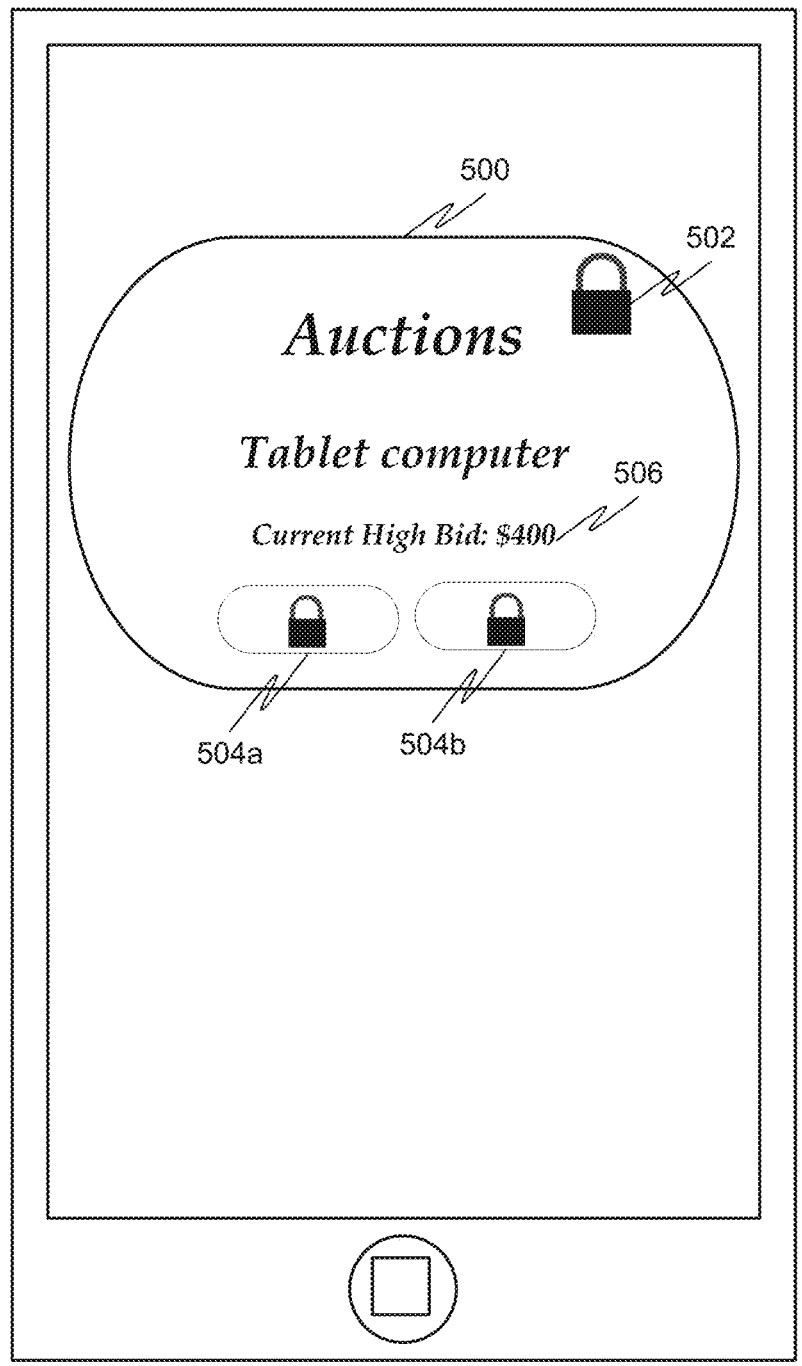
FIGS. 5-7 depict an example portion of a home screen of a client machine having a widget executing thereon in accordance with another example embodiment.

FIG. 5 depicts a first example portion of the home screen of the mobile device having an auction widget executing thereon in accordance with an example embodiment. As depicted, the auction widget 500 is locked and one or more interactive features on the widget are made inactive, as indicated by the "lock" icon 502, and additional lock icons positioned where one or more interactive features are normally displayed 504a, 504b. While these interactive features are inactive while the auction widget 500 is in its locked state, information about the item, such as the current high bid 506 may continue to be displayed and updated as the status changes.

Figure 6:
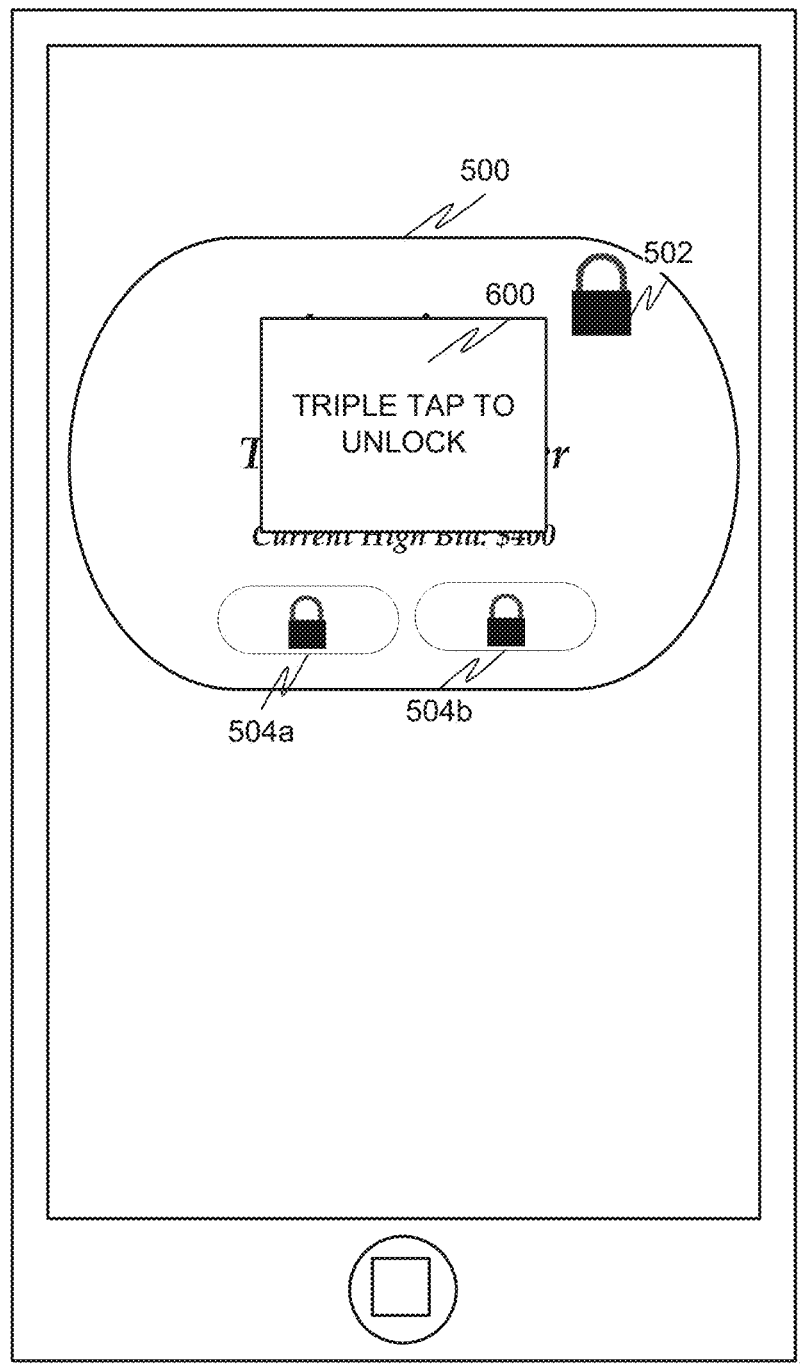
Figure 7:
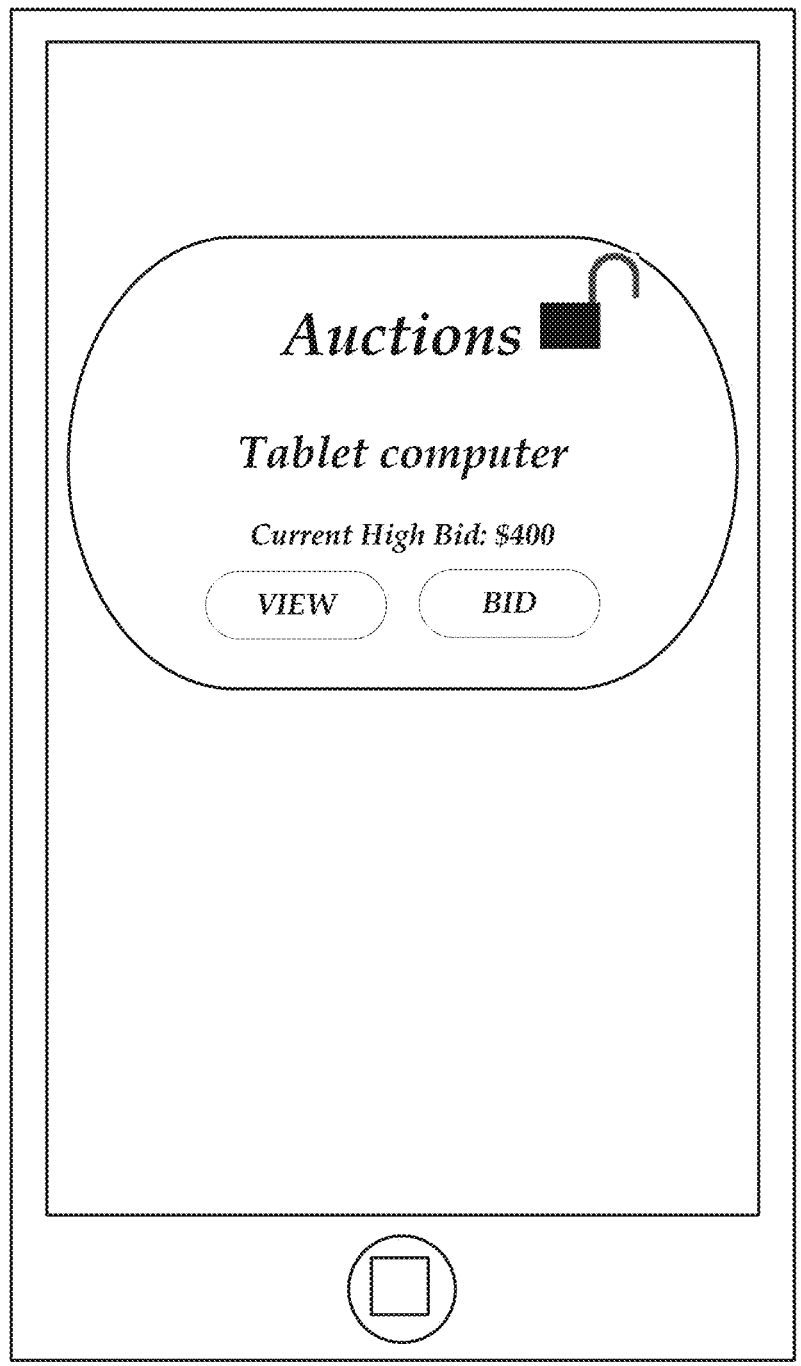

As shown in FIG. 6, directions 600 for unlocking the widget may be displayed to the user. Here, the instructions 600 indicate that the user needs to "triple tap" to unlock, namely to press his or her finger on the widget three times. Upon receiving an input from the user that complies with the instructions given, the widget is unlocked and one or more buttons or other interactive features of the widget are activated. In the unlocked state, the widget operates normally and has an additional interactive feature that allows the user to lock the widget, as depicted in FIG. 7. As can be seen, now that the auction widget 500 has been unlocked, the user is able to view 702 more information about the item (such as open an item page listing a description, current high bid and bidder, ending time, etc.) as well as bid 704. As such, in this example it can be seen how the auction widget continues to alert the user of the current high bid even while in a locked state, but the act of entering a higher bid is restricted while in the locked state. This allows, for example, a parent to temporarily give his or her smartphone to a child (for example, to play a game with while the parent drives a vehicle), and even though the smartphone as a whole is unlocked while in the hands of the child, the child's ability to interact with the widget is limited. This protection can be even further extended by adding an authentication component into the process, which will be described in more detail later. In addition to protecting against a child from accessing the widget, the lock also has the ability to prevent a user from inadvertently triggering an action in the widget. For example, it is not uncommon for a smartphone to automatically trigger an action when the user places the smartphone in his or her pocket, where the touchscreen may be accidentally depressed through normal body movement. A locking mechanism would prevent such an occurrence from happening to any protected widget. This is especially important because widgets may be viewable even when the smartphone as a whole is locked.

Figure 8:
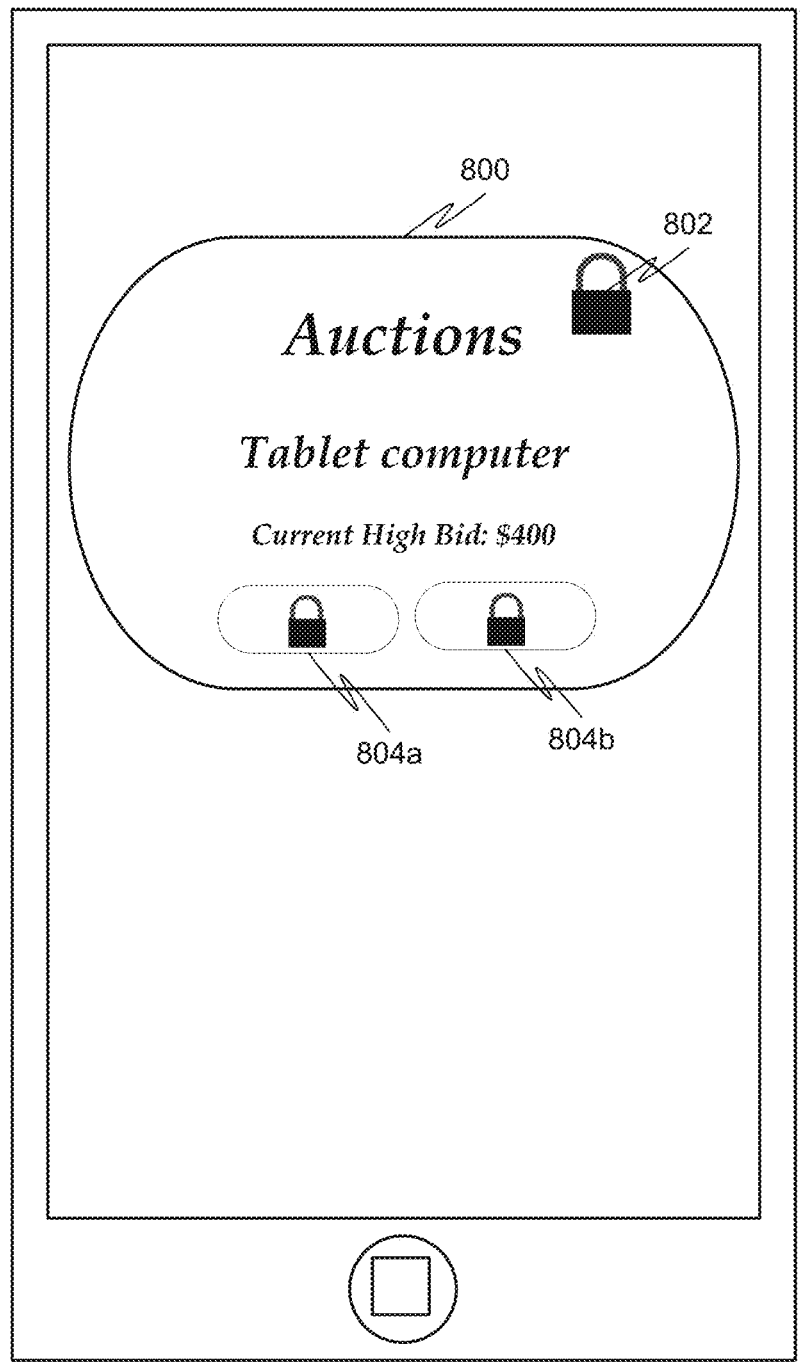
FIGS. 8-10 depict an example portion of a home screen of a client machine having a widget executing thereon in accordance with another example embodiment.
Figure 9:
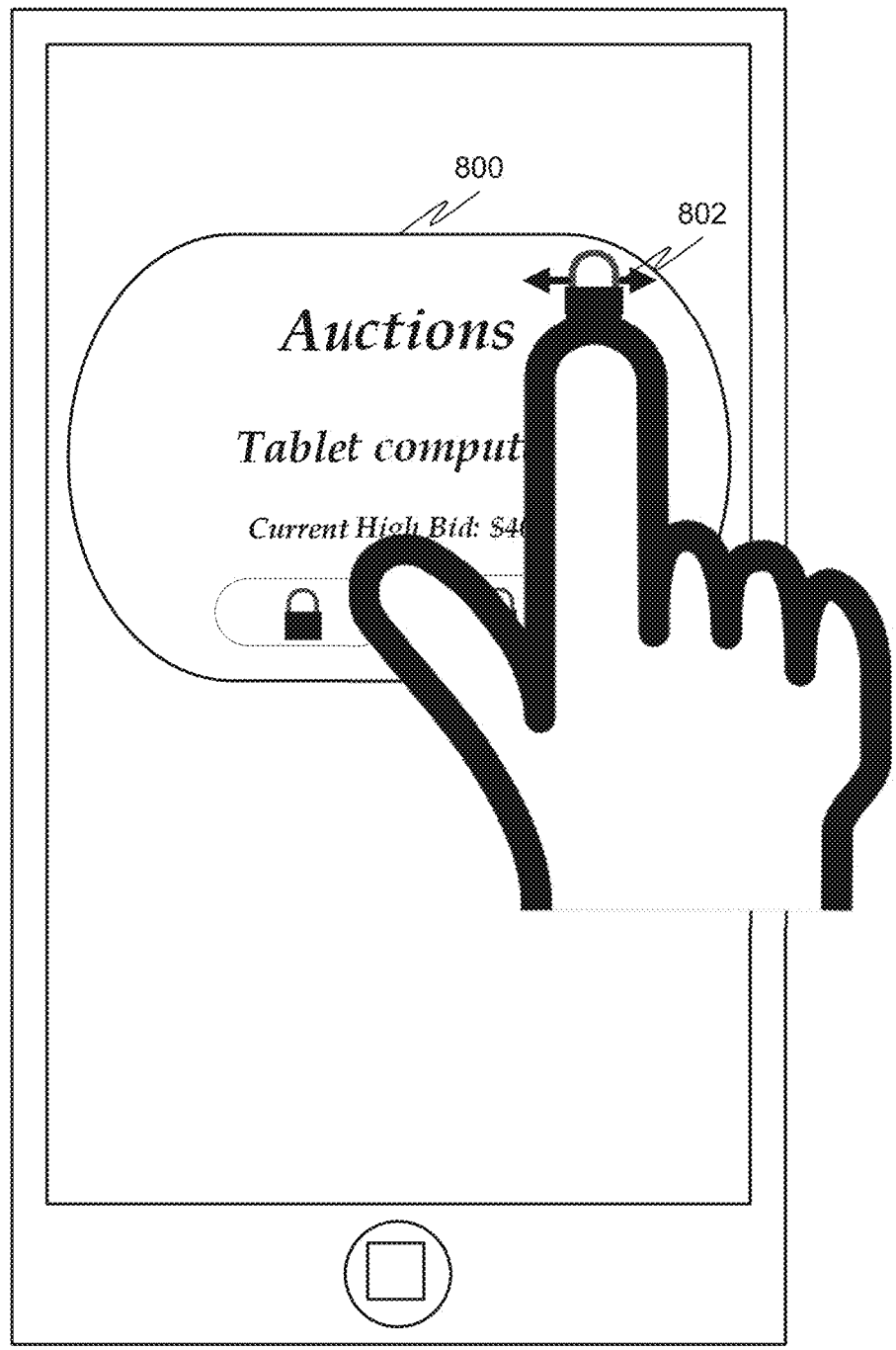
Figure 10:
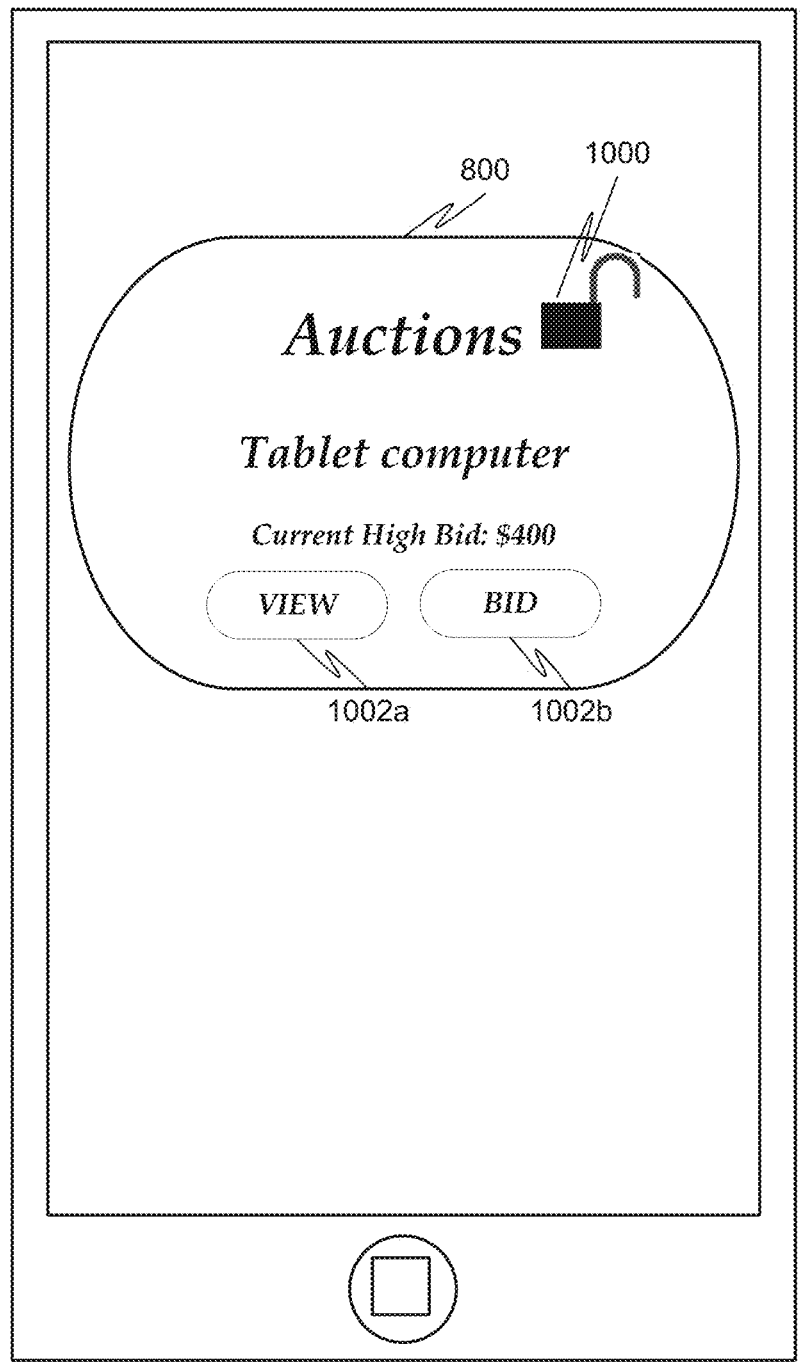

FIGS. 8-10 depict an alternative mechanism for unlocking an auction widget in accordance with an example embodiment. Here, as in FIG. 5, FIG. 8 depicts an auction widget 800 having a locked icon 802 as well as locks 804a, 804b on interactive features that are rendered inoperable during the locked state. FIG. 9 depicts how a user can unlock the auction widget 800 by pressing on the locked icon 802 and "jiggling" it (i.e., moving quickly back and forth a number of times). This results in an unlocked auction widget 800, as evidenced by the unlocked icon 1000 and the availability of interactive features 1002a, 1002b in FIG. 10.

As described earlier, as an additional security feature the system may require some sort of authentication be performed to verify that the user is allowed to unlock the widget. Authentication is the act of verifying that the user is who he or she claims to be. This may either be performed anytime the user wishes to unlock the widget (and, in fact, may take the place of some other sort of sequence needed to unlock the widget, such as the sequences depicted in FIGS. 2-10), or may appear when the input sequence received does not match the sequence described in the instructions. For example, if the user does not properly drag the lock icon in FIG. 3 to the bottom left corner, but instead drags it to the right, then the system may determine that the instructions were performed incorrectly. If this occurs a preset number of times (for example, the input is incorrect 3 times), then the system may trigger an authentication sequence.

Figure 11:
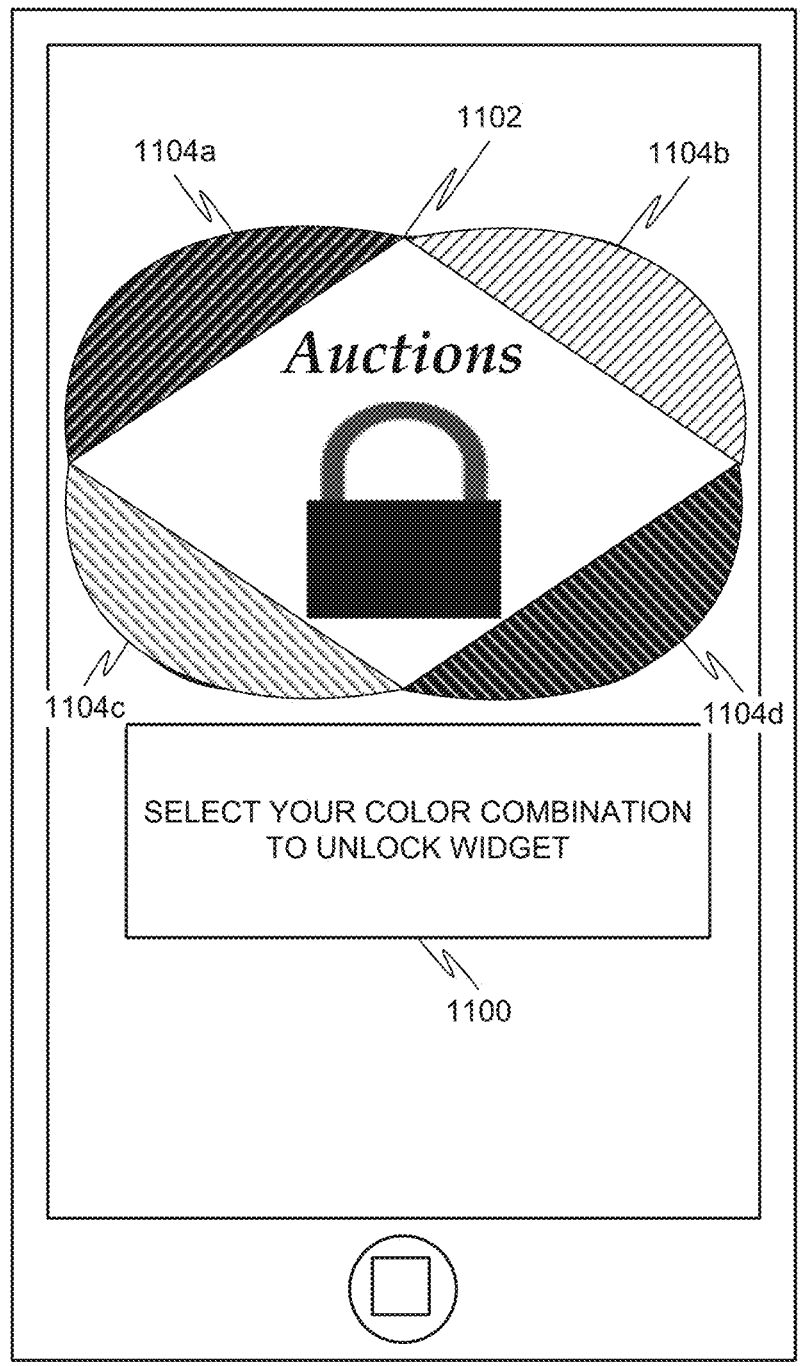
FIG. 11 depicts an example portion of a home screen of a client machine having an authentication mechanism combined with a widget in accordance with another example embodiment.

In one example embodiment (not pictured), the authentication sequence may simply be a request for the user to enter a password. In another example embodiment, a series of gestures or taps must be received in the proper sequence. FIG. 11 depicts an example widget in a locked state where some input has been received but the received input does not comply with the requirements to unlock the widget. In the example shown in FIG. 11, instructions 1100 to authenticate the user are displayed outside the boundaries of the widget 1102 on the home screen. Further, interactive icons 1104a, 1104b, 1104c, 1104d that are not part of the widget 1102 are added to the home screen and/or widget. These interactive icons 1104a, 1104b, 1104c, 1104d are only interactive for the purpose of authenticating the user. As depicted, portions of the widget are overlaid with 4 regions of different color. To unlock the widget, the user is directed to touch the four regions in a predefined combination or sequence. Other pre-defined combinations of gestures, color inputs, or alphanumeric inputs may be used by user to unlock the widget.

In some instances, various widgets on the same device may be locked or unlocked using the same inputs. In other embodiments, a first input may be required to lock or unlock a first widget and a second input may be required to lock or unlock a second widget.

The input used to lock or unlock the widget may be specified by the user, by the widget, and/or by the locking system that locks the widgets. For example, the user may be instructed to select one or more inputs used a lock one or more widgets. The widget itself may limit the inputs used to lock or unlock the widget. In some instances, a user or the lockable widget may define a secret input used to unlock a widget. The secret input may be a gesture, a color combination, or an alphanumeric input.

In some instances, the widgets themselves may include the requisite coding or modules to enable the lock. In other instances, the mobile device may execute a separate application that accesses each widget to enable locking and unlocking.

Figure 12:
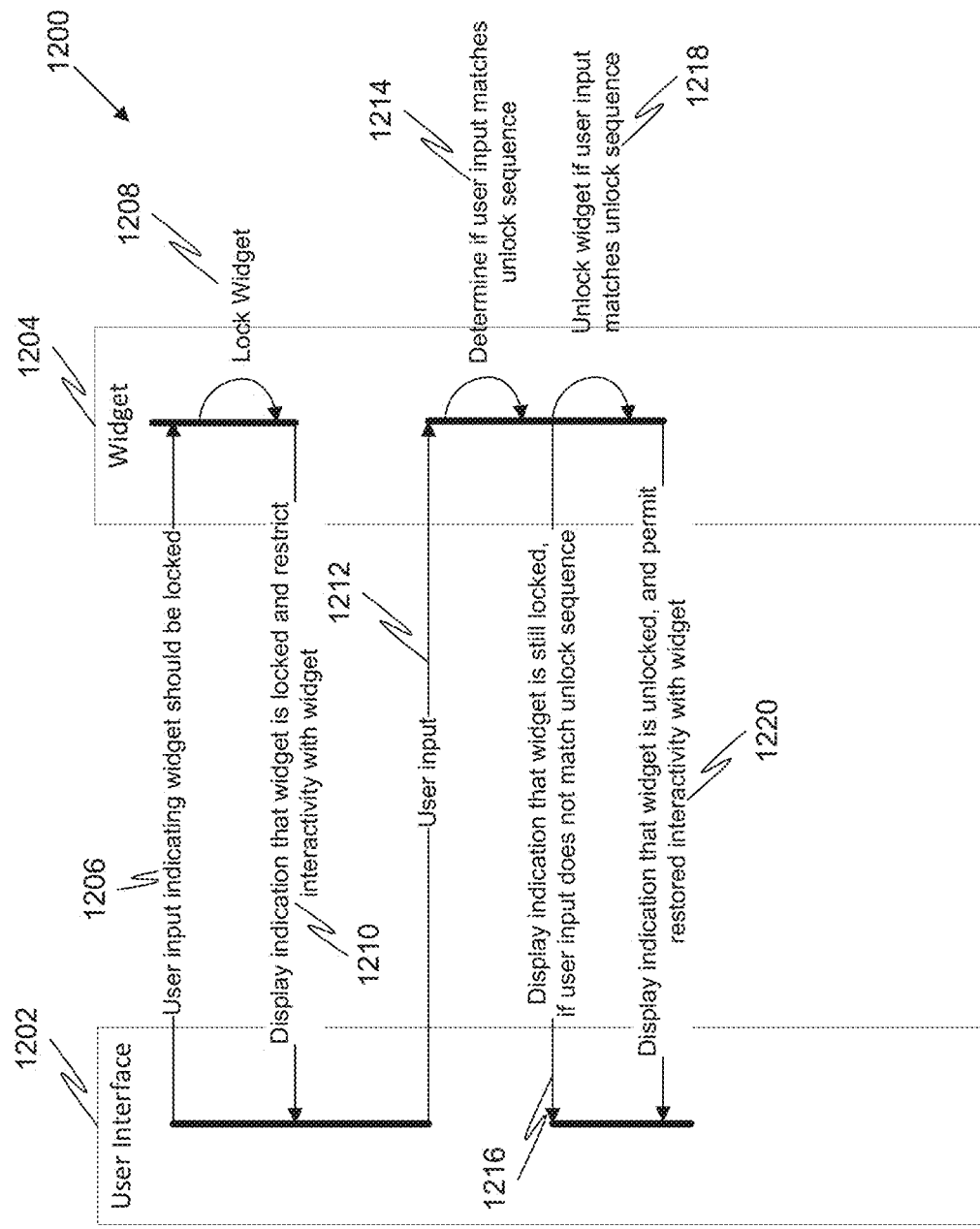
FIG. 12 is an interaction diagram illustrating a process for locking and unlocking a widget in accordance with one example embodiment.

FIG. 12 is an interaction diagram illustrating a process for locking and unlocking a widget in accordance with one example embodiment. In an example, the process 1200 can include a user interface 1202 interacting with a widget 1204. In this embodiment, the widget 1204 performs the locking and unlocking functions on itself. As such, at 1206 user input is received from the user interface 1202 indicating that the widget 1204 should be locked. At 1208, the widget 1204 then locks itself. At 1210, the widget 1204 generates a display that includes an indication that the widget 1204 is locked on the user interface 1202, and also restricts interactivity with the widget 1204. The indication that the widget 1204 is locked may be, for example, a "locked" icon displayed on the widget. The restricting of interactivity may be the disabling of one or more buttons for the widget 1204 on the user interface 1202 (such as by graying out or removing the buttons).

At some point later, the user may provide some input that may or may not indicate a desire to unlock the widget 1204. At 1212, the widget 1202 receives user input from the user interface 1200. At 1214, the widget 1204 may determine if the user input matches a predetermined unlock sequence. If not, then at 1216 an indication may be displayed that the widget is still locked. If the user input matches the unlock sequence, then at 1218 the widget 1204 may unlock itself. At 1220, the widget 1204 may display on the user interface 1202 an indication that the widget 1204 is unlocked (e.g., an unlocked icon) and may permit restored interactivity with the widget 1204 (e.g., un-greyout or redisplay the buttons).

Figure 13:
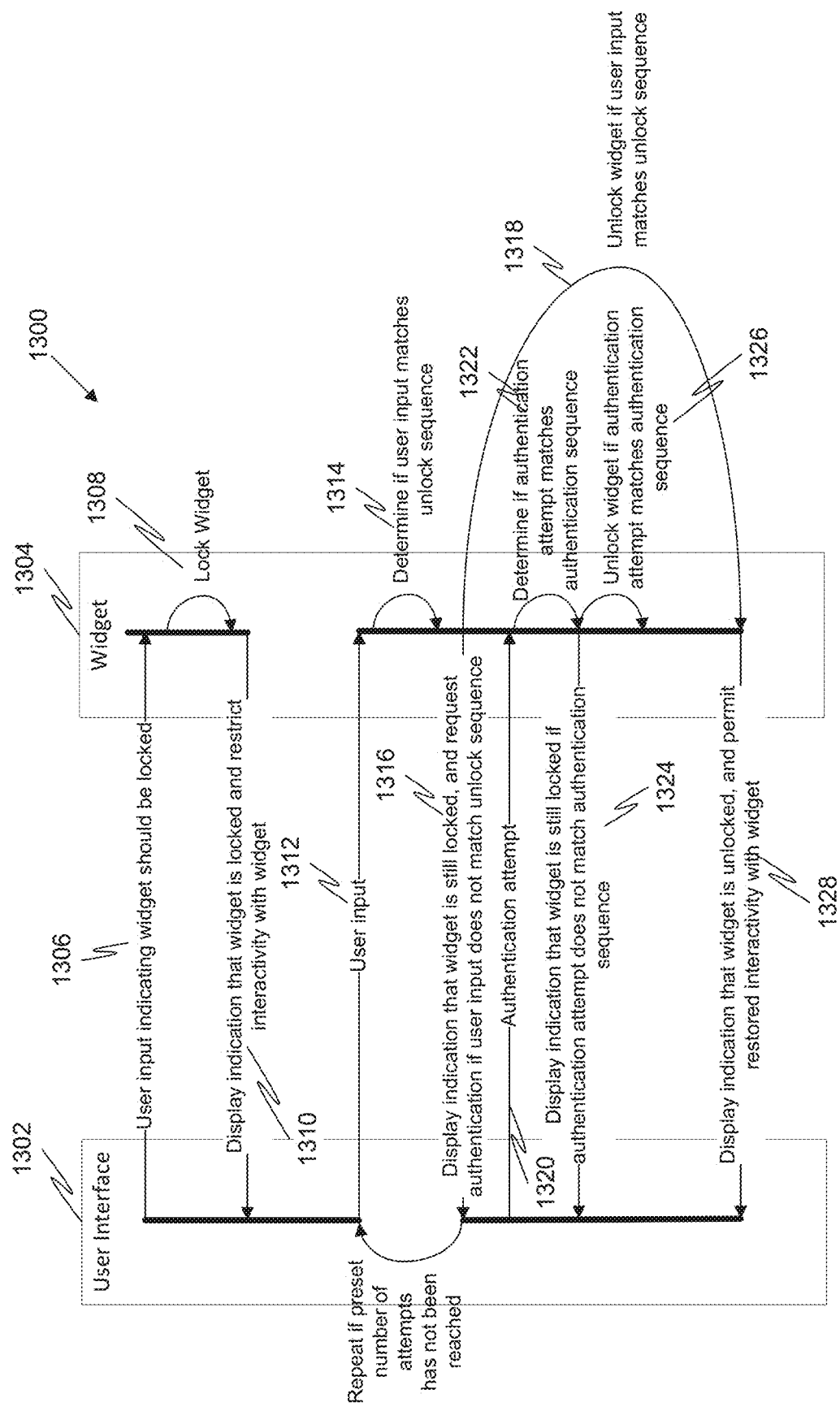
FIG. 13 is an interaction diagram illustrating a process for locking and unlocking a widget in accordance with another example embodiment.

FIG. 13 is an interaction diagram illustrating a process for locking and unlocking a widget in accordance with another example embodiment. This embodiment is similar to FIG. 12 in that the components of the process 1300 include a user interface 1302 and a widget 1304, with the widget 1304 acting to lock itself. In this embodiment, however, an additional authentication process is executed if the unlock sequence is not entered correctly after a preset number of attempts.

At 1306, user input indicating that the widget should be locked is received by the widget 1304. At 1308, the widget 1304 locks itself. At 1310, the widget 1304 displays an indication that the widget 1304 is locked on the user interface 1202, and also restricts interactivity with the widget 1304.

At some point later, the user may provide some input that may or may not indicate a desire to unlock the widget 1304. At 1312, the user input is received from the user interface 1302. At 1314, the widget 1304 may determine if the user input matches a predetermined unlock sequence. If not, then at 1316 an indication may be displayed that the widget is still locked, and request authentication (assuming a preset number of attempts to unlock the widget has been reached).

If the user input matched the unlock sequence, then at 1318 the widget 1304 may unlock itself.

Assuming the authentication route is taken, then at 1320 an authentication attempt may be received. At 1322, it may be determined if the authentication attempt matches a preset authentication sequence. If not, then at 1324 an indication that the widget is still locked may be displayed. If the authentication attempt matches the preset authentication sequence, then at 1326 the widget may unlock itself. Finally, at 1328, the widget 1304 may display on the user interface 1302 an indication that the widget 1304 is unlocked (e.g., an unlocked icon) and may permit restored interactivity with the widget 1304 (e.g., un-greyout or redisplay the buttons).

Figure 14:
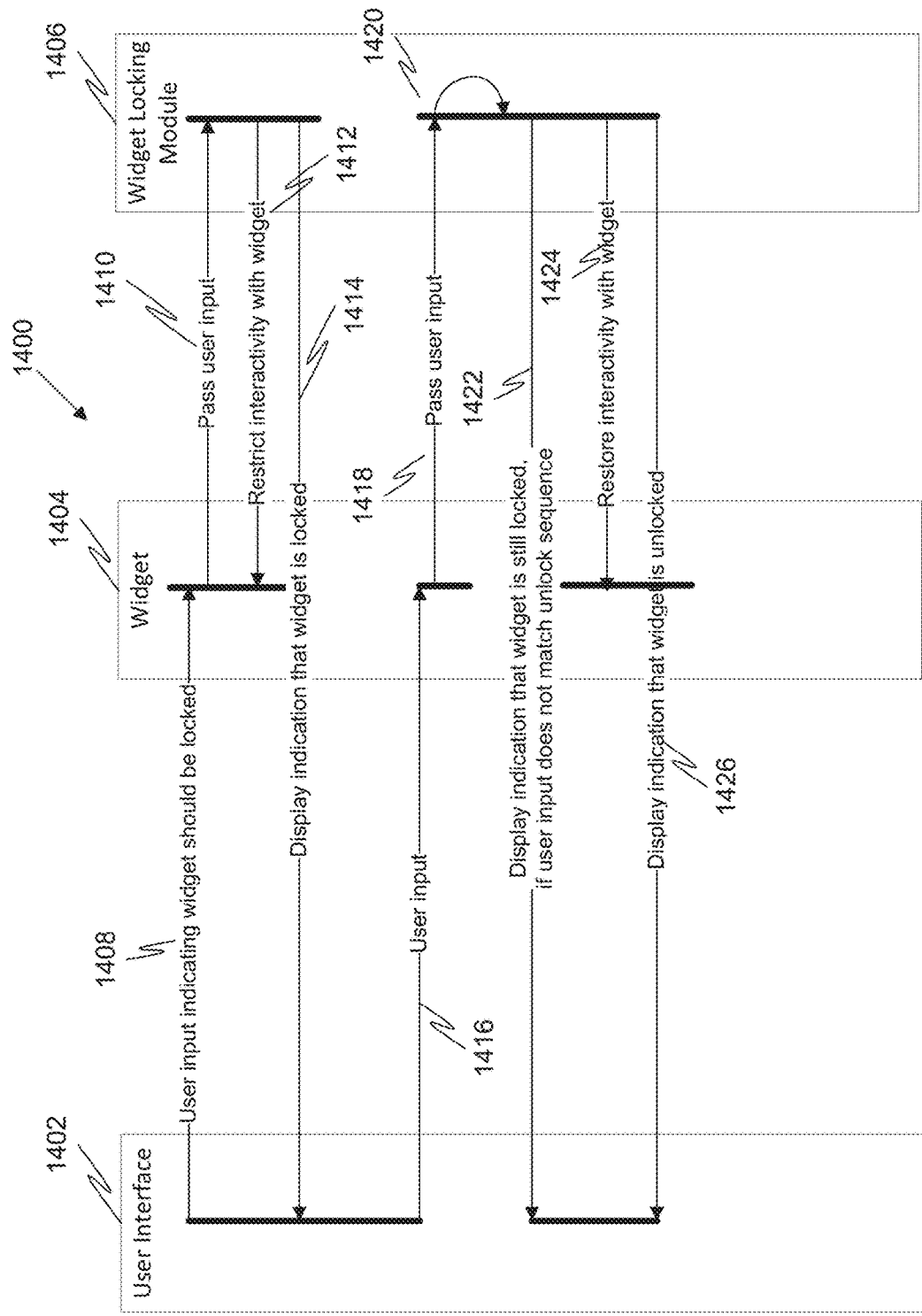
FIG. 14 is an interaction diagram illustrating a process for locking and unlocking a widget in accordance with another example embodiment.

FIG. 14 is an interaction diagram illustrating a process 1400 for locking and unlocking a widget in accordance with another example embodiment. In this embodiment, a user interface 1402 and widget 1404 are provided, however unlike FIGS. 12-13, an additional widget locking module 1406 is provided. At 1408, user input indicating that the widget should be locked is received by the widget 1404. At 1410, the user input is passed to the widget locking module 1406. At 1412, the widget locking module 1406 locks the widget 1404 (i.e., interactivity with the widget is restricted). At 1414, the widget locking module displays an indication that the widget 1404 is locked on the user interface 1402.

At some point later, the user may provide some input that may or may not indicate a desire to unlock the widget 1404. At 1416, the user input is received from the user interface 1402. At 1418, the widget 1414 passes the user input to the widget locking module 1406. At 1420, the widget locking module 1406 may determine if the user input matches a predetermined unlock sequence. If not, then at 1422 an indication may be displayed that the widget is still locked. If the user input matches the unlock sequence, then at 1424 the widget locking module 1406 may unlock the widget 1404 (i.e., restore interactivity). At 1426, the widget 1406 may display on the user interface 1402 an indication that the widget 1404 is unlocked (e.g., an unlocked icon).

Figure 15:
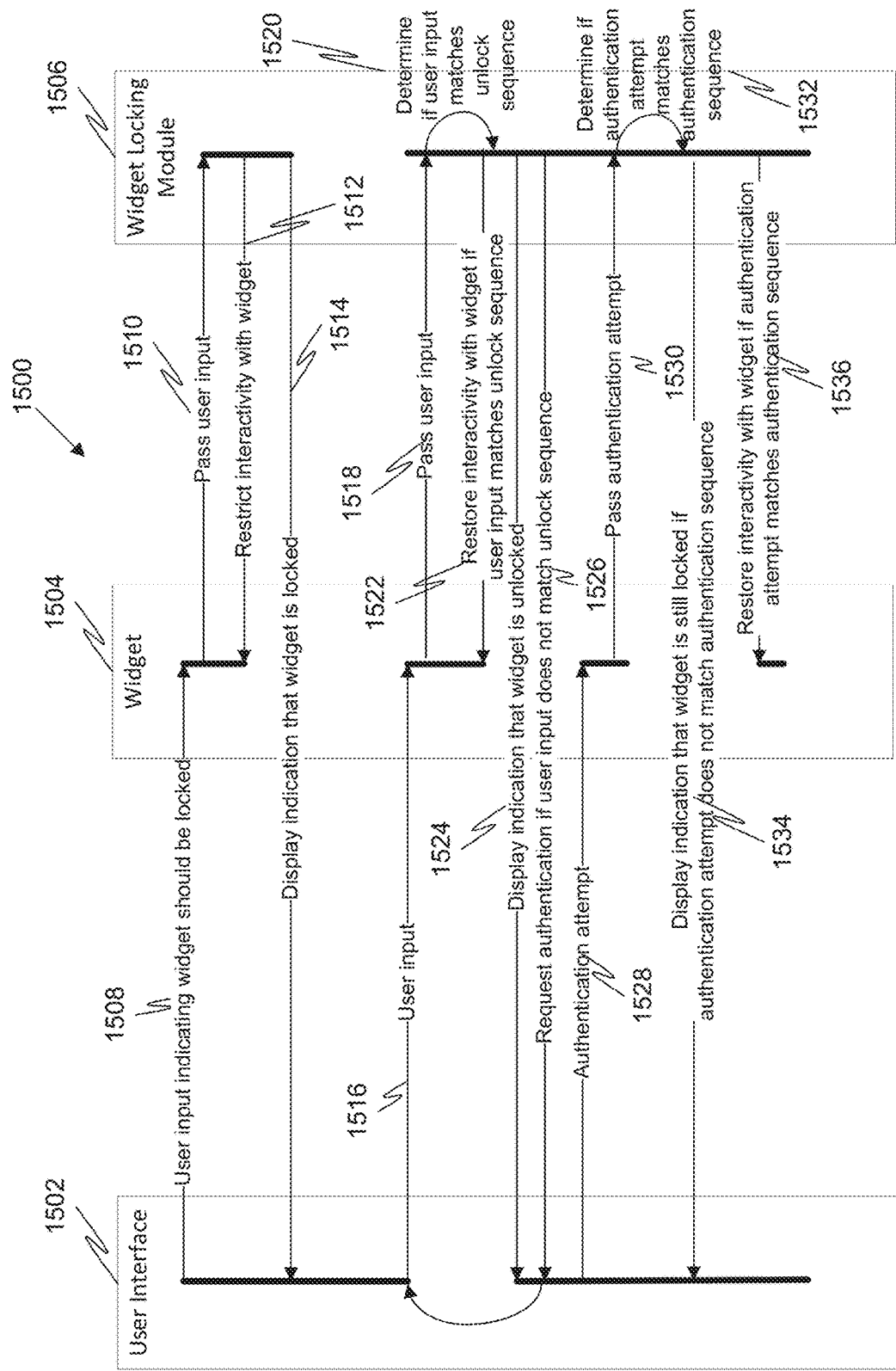
FIG. 15 is an interaction diagram illustrating a process for locking and unlocking a widget in accordance with another example embodiment.

FIG. 15 is an interaction diagram illustrating a process 1500 for locking and unlocking a widget in accordance with another example embodiment. This embodiment is similar to FIG. 14 in that the components include a user interface 1502, a widget 1504, and a widget locking module 1506 acting to lock the widget 1504. In this embodiment, however, an additional authentication process is executed if the unlock sequence is not entered correctly after a preset number of attempts.

At 1508, user input indicating that the widget should be locked is received by the widget 1504. At 1510, the user input is passed to the widget locking module 1506. At 1512, the widget locking module 1506 locks the widget 1504 (i.e., interactivity with the widget is restricted). At 1514, the widget locking module displays an indication that the widget 1504 is locked on the user interface 1502.

At some point later, the user may provide some input that may or may not indicate a desire to unlock the widget 1504. At 1516, the user input is received from the user interface 1502. At 1518, the widget 1514 passes the user input to the widget locking module 1506. At 1520, the widget locking module 1506 may determine if the user input matches a predetermined unlock sequence. If so, then at 1522 interactivity with the widget may be restored, and at 1524 an indication that the widget 1504 is unlocked may be displayed on the user interface 1502. If the user input does not match the predetermined unlock sequence, then at 1526 the widget locking module 1502 may request authentication of the user (assuming a preset number of attempts to unlock the widget has been reached).

Assuming the authentication route is taken, then at 1528 an authentication attempt may be received. At 1530, this authentication attempt may be asked to the widget locking module 1506. At 1532, it may be determined if the authentication attempt matches a preset authentication sequence. If not, then at 1534 an indication that the widget is still locked may be displayed. If the authentication attempt matches the preset authentication sequence, then at 1536 the widget locking module 1506 may unlock the widget 1504.

Figure 16:
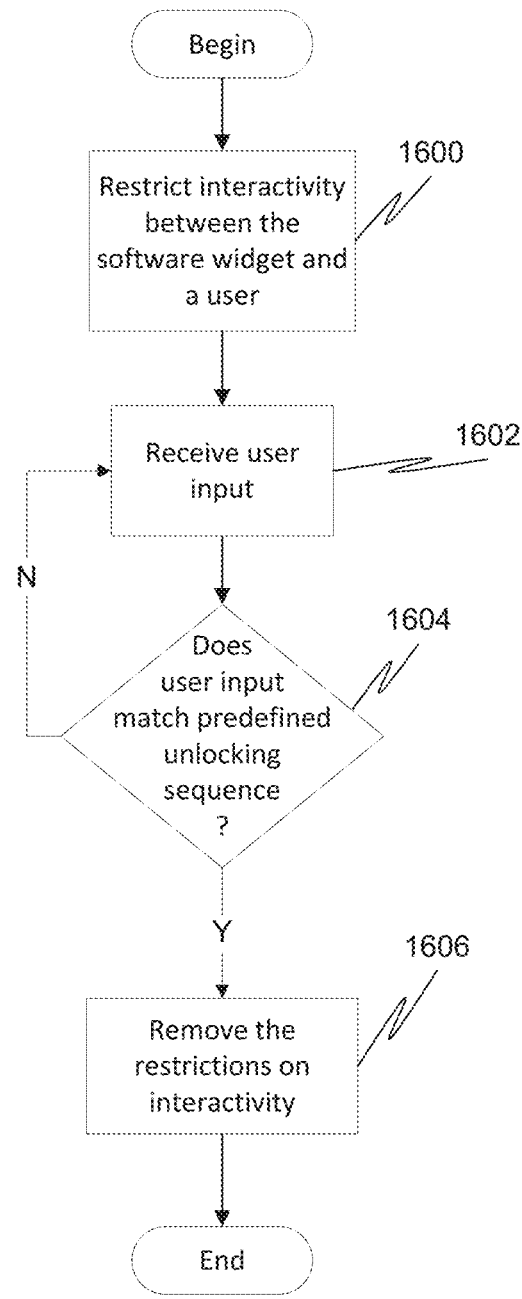
FIG. 16 is a flow diagram illustrating a process for locking and unlocking a widget in accordance with another example embodiment.

FIG. 16 is a flow diagram illustrating a method for securing a software widget on a user device in accordance with an example embodiment. At 1600, while the software widget is in a locked mode, interactivity is restricted between the software widget and a user. At 1602, user input is received. At 1604, it is determined if the user input matches a predefined unlocking sequence. If not, then the process loops back to 1602. If so, then at 1606 the restrictions on interactivity are moved by placing the widget in an unlocked mode.

It should be noted that while the above examples depict lockable widgets in the context of mobile devices such as smartphones and tablet computers, similar concepts can be applied to other hardware devices. For example, a head unit of a vehicle, such as a car, may be designed to permit software applications to run. As such, it may be possible to design software widgets for such head units much in the same way software widgets can be designed for smartphones or tablet computers. For example, it may be desirable to provide a software widget for the user to see the current status of an online auction on the head unit of the vehicle. As such, the same type of locking mechanisms described above can also be applied to the head unit embodiment. In another example, a television, set-top box, or Blu-Ray player may be designed to permit software applications to run, and thus could be designed to allow software widgets as described above.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 17:
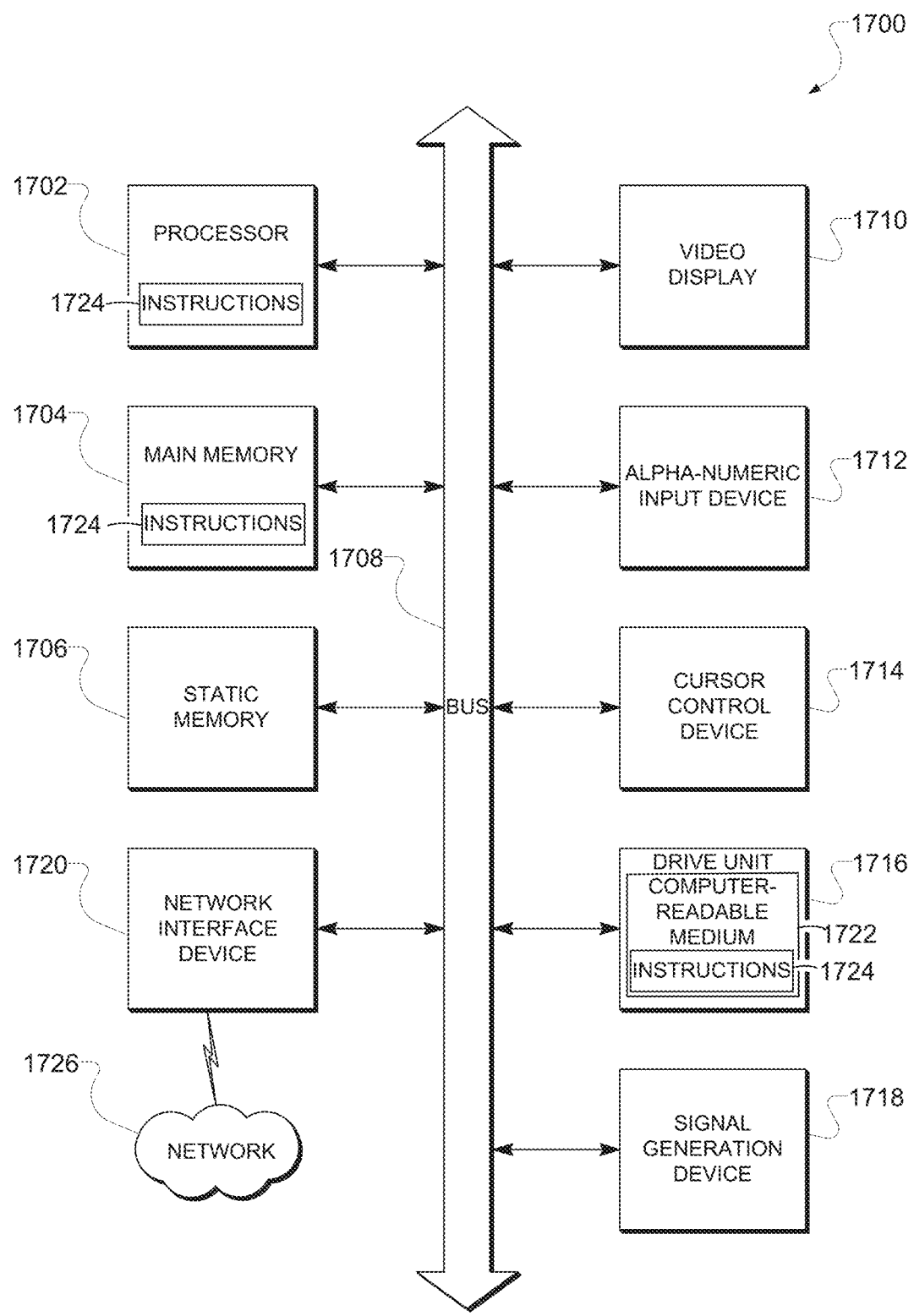
FIG. 17 shows a diagrammatic representation of machine in the example form of a computer system within which a set of instructions, for causing the machine to perform any one or more of the methodologies discussed herein, may be executed.

FIG. 17 is a block diagram of machine in the example form of a computer system 1700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A user device comprising:
a display;
a memory;
a processor operable to execute a first software widget, wherein the first software widget automatically displays information on the display and permits user interaction with the first software widget; and
a widget module executable by the processor and configured to:
place the first software widget in a first mode, the placing of the first software widget in the first mode not affecting a first mode of any other software widgets on the user device;
while the first software widget is operating in the first mode, receive first user input; and
in response to the receiving of the first user input, alter a state of the first software widget to a second mode, the first user input not affecting the first mode of any other software widgets on the user device.

2. The user device of claim 1, wherein the first user input is a navigation input in a first direction and a second direction opposite the first direction.

3. The user device of claim 1, wherein the first user input is a triple tap motion.

4. The user device of claim 1, wherein the first user input is selection of colors on the display.

5. The user device of claim 1, wherein the altering removes restrictions on interactivity between the first software widget and the user device placed in the first mode while not affecting interactivity of any other software widgets on the user device.

6. The user device of claim 1, wherein the widget module is further configured to:
 initiate an authentication sequence, based at least in part on receiving a predefined number of user input attempts failing to match a first predefined sequence, wherein the authentication sequence requires a user to enter specific user input corresponding to the user;
 receive, in response to initiating the authentication sequence, additional user input; and
 alter the state of the first software widget to the second mode, upon validation that the additional user input matches the authentication sequence, the second mode removing the first mode for the first software widget.

7. The user device of claim 1, wherein the display is a touchscreen display.

8. A method comprising:
 placing a first software widget in a first mode on a user device, the placing of the first software widget in the first mode not affecting a first mode of any other software widgets on the user device;
 while the first software widget is operating in the first mode, receiving first user input; and
 in response to the receiving of the first user input, altering a state of the first software widget to a second mode, the first user input not affecting the first mode of any other software widgets on the user device.

9. The method of claim 8, wherein the first user input is a navigation input in a first direction and a second direction opposite the first direction.

10. The method of claim 8, wherein the first user input is a triple tap motion.

11. The method of claim 8, wherein the first user input is selection of colors on a display.

12. The method of claim 8, wherein the altering removes restrictions on interactivity between the first software widget and the user device placed in the first mode while not affecting interactivity of any other software widgets on the user device.

13. The method of claim 8, further comprising:
 initiating an authentication sequence, based at least in part on receiving a predefined number of user input attempts failing to match a first predefined sequence, wherein the authentication sequence requires a user to enter specific user input corresponding to the user;
 receiving, in response to initiating the authentication sequence, additional user input; and
 altering the state of the first software widget to the second mode, upon validation that the additional user input matches the authentication sequence, the second mode removing the first mode for the first software widget.

14. The method of claim 11, wherein the display is a touchscreen display.

15. A non-transitory machine-readable storage medium embodying instructions which, when executed by a machine, cause the machine to execute operations comprising:
 placing a first software widget on a user device in a first mode, the placing of the first software widget in the first mode not affecting a first mode of any other software widgets on the user device;
 while the first software widget is operating in the first mode, receiving first user input; and
 in response to the receiving of the first user input, altering a state of the first software widget to a second mode, the first user input not affecting the first mode of any other software widgets on the user device.

16. The non-transitory machine-readable storage medium of claim 15, wherein the first user input is a navigation input in a first direction and a second direction opposite the first direction.

17. The non-transitory machine-readable storage medium of claim 15, wherein the first user input is a triple tap motion.

18. The non-transitory machine-readable storage medium of claim 15, wherein the first user input is selection of colors on a display.

19. The non-transitory machine-readable storage medium of claim 15, wherein the altering removes restrictions on interactivity between the first software widget and the user device placed in the first mode while not affecting interactivity of any other software widgets on the user device.

20. The non-transitory machine-readable storage medium of claim 15, wherein the operations further comprise:
 initiating an authentication sequence, based at least in part on receiving a predefined number of user input attempts failing to match a first predefined sequence, wherein the authentication sequence requires a user to enter specific user input corresponding to the user;
 receiving, in response to initiating the authentication sequence, additional user input; and
 altering the state of the first software widget to the second mode, upon validation that the additional user input matches the authentication sequence, the second mode removing the first mode for the first software widget.

* * * * *